United States Patent [19]
Dehne et al.

[11] 3,924,421
[45] Dec. 9, 1975

[54] OVERLOAD CLUTCH

[75] Inventors: Wilfried E. Dehne, Berwyn; Josef Mang, Bridge View, both of Ill.

[73] Assignee: Emerson Electric Co., St. Louis, Mo.

[22] Filed: Dec. 12, 1974

[21] Appl. No.: 532,022

[52] U.S. Cl.................................. 64/29; 192/30 W
[51] Int. Cl.².............................................. F16D 7/00
[58] Field of Search............... 192/30 W, 56 L, 150; 64/29

[56] References Cited
UNITED STATES PATENTS

| | | | |
|---|---|---|---|
| 1,443,026 | 1/1923 | Lee.......................................... | 64/29 |
| 2,202,497 | 5/1940 | Landahl............................. | 64/29 X |
| 2,753,029 | 7/1956 | Babian................................. | 64/29 X |
| 3,132,730 | 5/1964 | Dahlstrand et al.................. | 64/29 X |
| 3,724,815 | 4/1973 | Hawkins et al...................... | 64/29 X |

*Primary Examiner*—Allan D. Herrmann
*Attorney, Agent, or Firm*—Polster and Polster

[57] ABSTRACT

A totally enclosed adjustable overload clutch is provided, between a driving and a driven member, in which a cam follower is so mounted with respect to a cam plate as to permit the driving member to rotate when the driven member is overloaded, without disengaging the cam follower from the peripheral surface of the cam plate, without destroying the clutch. The cam follower can be reseated in a seat in the periphery of the cam plate simply by rotating one of the driving and driven members relative to the other in either direction, without access to the interior of the enclosure.

An overload detector assembly is mounted outside the enclosure in such a way as to respond immediately to overload, without repairing any electrical or mechanical interconnection with elements of the cam assembly inside the enclosure.

8 Claims, 6 Drawing Figures

OVERLOAD CLUTCH

BACKGROUND OF THE INVENTION

Overload clutches, positioned between a roating driving member and a rotated driven member to prevent damage when the driven member is prevented from rotating, are old and well known. Illustrative examples from the patent art include U.S. Pats. to Duncan et al, No. 1,441,491, Aldeen, No. 1,548,427, Landahl, No. 2,202,497, Babaian, No. 2,753,029, Hall, Reissue No. 23,361, Lutz, No. 3,561,576, Zanon, No. 1,391,601 and Gerstung, No. 2,826,903.

Conventional overload clutches have either been arranged to throw out a cam follower, as by a latching pawl arrangement, of which Duncan et al and Aldeen, above, are typical examples, or by an overcentering arrangement, of which Landahl is an example, or a catch, such as is shown in Hall, or they have been arranged to break a circuit to stop the rotation of the driving member, as in Babaian. These arrangements have required easy access to the cam follower assembly, to permit the cam follower to be restored to its engaging condition. In Lutz, two cam followers are moved axially with respect to cam seats in the cam plate and a circuit breaking arrangement is provided, which permits restoration of the cam followers to the seats by rotation of the driving and driven members in the oppoiste direction from the normal direction of rotation. In Zanon, three simple spring loaded detents project into notches and are said to permit relative rotation of the driving and driven members.

Even in the Lutz and Zanon devices, the overload clutch is exposed.

Gerstung shows an extremely simple arrangement of a U-shaped spring, the legs of which embrace a non-circular, cam, all of which is enclosed in a housing. The releasing of the Gerstung clutch depends upon the bowing of the legs of the spring.

In the prior art devices, either the cam plate has been made of a small radius, to permit the accommodation of follower biasing means in the same plane, or the cam follower has been cantilevered.

As a result of the use of the various constructions described, the overload clutches have not been sealed and permanently lubricated, and for most of them, it has been necessary to reach into the mechanism to restore the cam follower to its engaging position.

In those of the prior art devices in which provision is made for overload signalling or automatic power cut-off, the mechanism has been actuated by a lever or other movable support for the cam follower. This has necessitated either leaving the lever exposed, as in Lutz, or partly exposed, as in Babaian, in which the cam follower must be in the part of the clutch connected to the driving member, or else making provision for sliding electrical contact as in Grohn, U.S. Pat. No. 2,003,115.

SUMMARY OF THE INVENTION

An overload clutch is provided of the type in which a driven member is releasably connected to a driving member by means of a spring loaded follower, mounted on one of the members, normally engaged in a seat in a cam plate mounted on the other of the members. In the present invention, a generally circular cam plate, narrow in its axial dimension compared with its radial dimension, is provided with a seat in its periphery. A housing, rotatably mounted on the hub, completely encloses the cam plate. The housing has within it a lever cavity, spaced, aligned journal wells opening through side walls defining the lever cavity, on opposite sides of the cam plate and a spring well opening into the lever cavity at a point axially displaced from the cam plate. Anti-friction bearings are provided between the housing and the hub to provide bearing surfaces for relative rotation between the housing and the hub. Annular seals are provided between the housing and the hub outboard of the anti-friction bearings in both axial directions. A dog-leg lever is mounted in the lever cavity on a shaft journaled in anti-friction bearings mounted in the journal wells. The lever has a yoke at one end with arms positioned at either side of the axial extent of the cam plate and a leg on the other side of the shaft from the yoke extending, at an angle, to a position axially clear of the cam plate at the end of the leg opposite the yoke. The yoke arms carry a pin, upon which a roller-follower is rotatably mounted on anti-friction bearings, the roller-follower normally seating in the cam plate seat. A compression spring seated at one end in the housing spring well, bears at its other end upon the lever leg at the end of the lever leg axially clear of the cam plate.

An overload detector assembly is provided outside of the housing. It includes a segmented flat annulus, mounted on the outside of the housing, the segments of which are slidably mounted for limited radial movement and biased radially inwardly, and an annular cam hub, mounted on the clutch hub. The radially inner edges of the segments of the annulus and the radially outer edges of the detector cam hub have complementary projections and indentations in which the projections seat. Upon relative rotation of the annulus and cam hub, the projections are driven from the indentations, moving the segments radially outwardly to actuate a control, such as a micro switch or hydraulic, pneumatic or mechanical control or signal.

One of the objects of this invention is to provide a totally enclosed overload clutch which is simple in operation, rugged, effective over a wide range of speeds and economical.

Another object is to provide such a clutch which eliminates the need for a hold-out mechanism.

Another object is to provide such a clutch which is bi-directional and can be made with equal release torque in both directions or selectively greater release torque in one or the other direction.

Still another object is to provide a totally enclosed clutch with an overload detector assembly which requires no access to the interior of the clutch enclosure, which is light, simple, immediately responsive in any and every position and dependable.

Other objects will become apparent to those skilled in the art in light of the following description and accompanying drawings.

DESCRIPTION OF THE PREFERRED EMBODIMENT

Figure 1:
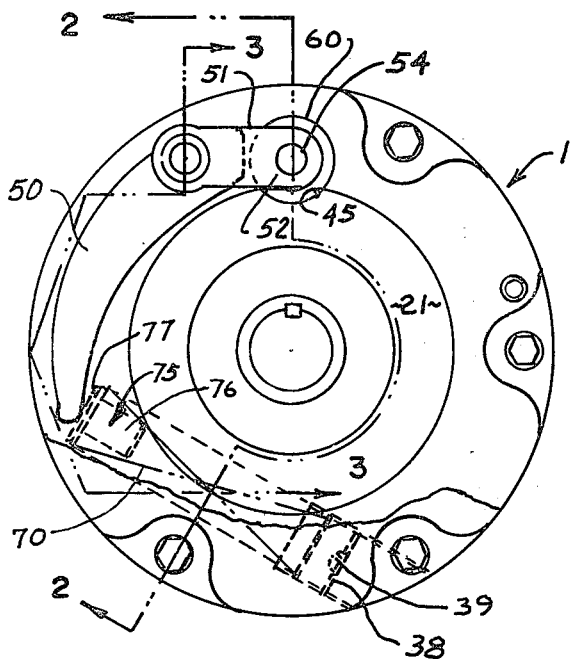
FIG. 1 is a view in end elevation, partly broken away, of one illustrative embodiment of overload clutch of this invention.

Referring now to the drawings for one illustrative embodiment of overload clutch of this invention, reference numeral 1 indicates an overload clutch which, in this embodiment, is shown as connecting a sprocket 2 to a shaft, not here shown, the end of which is mounted in and keyed to a hub 10. The hub 10 is cylindrical, and its internal construction is conventional. A cam plate 20 is made integral with or securely mounted to the hub 10 against roation relative to the hub, intermediate the two ends of the hub.

The sprocket 2 is mounted on an outside face of a wall 31 of a housing 30, which is rotatably mounted on the hub 10 and completely encloses the cam plate 20.

The housing 30 has a circumferential wall 32, which, in this embodiment, is integral with the wall 31, and a side wall 33, bolted against a flat annular radial face of the circumferential wall 32, in liquid tight engagement therewith. In the interior of the housing 30, the walls 31, 32 and 33 define an annular lever cavity 34, within which a dog-leg lever 50 is mounted.

The wall 31 has a heavy section in which an axially directed journal well 35 is formed. A journal well 36 in the wall 33 extends, in this embodiment, through the wall 33, and is axially aligned with the journal well 35. The journal well 36 is closed at its outboard end by a cap 63. In another heavy section or boss of the wall 31, a spring well 37, tending chordally, with its axis substantially parallel with flat side faces of the cam plate 20, extends through the housing wall 32 at one end and opens at its other into the lever cavity 34. The spring well 37 is internaly threaded through a part of its length from the end which extends through the wall 32, to take an externally threaded adjusting nut 38. The adjusting nut 38 has an allen wrench socket 39 in its outer surface, and when screwed into the threaded end of the spring well 37, tightly closes the end of the well.

An axially projecting annular rib 40 extends inboard from the side wall 33, and has a flat radial face 41. An axially projecting annular rib 44, of which the spring well boss is a part, with a flat radial face 45 extends inboard from the side wall 31. The faces 41 and 45 define between them an annular passage through which the cam plate 20 extends. Thrust washers 80 are interposed between the faces 41 and 45 and the flat side of the cam plate.

The radially inner face of the rib 40 is stepped to form a raceway channel 42 and a seal groove 43. The radially inner side of the rib 44 is similarly stepped to provide a raceway channel 46 and a seal groove 47.

Needle bearings 48 are mounted in both of raceway channels 42 and 46. Seals, which in the embodiment shown are in the form of 0-rings 49, are mounted in the seal grooves 43 and 47, axially outboard of the needle bearings 48. It will be understood that the needle bearings 48 will normally be caged in their own raceways, which will be snugly mounted in the housing raceways 42 and 46, and on cylindrical outer surfaces of the hub 10 on either side of the cam plate 20, to provide anitfriction bearings between the housing and the hub, for free rotation of the hub and housing with respect to one another. The 0-rings 49 bear snugly against walls of the housing and smooth cylindrical surfaces of the hub 10.

The cam plate 20 is bounded axially by flat, smooth, parallel radial side surfaces 21 and 22 and peripherally by a flat peripheral surface 24, interrupted, in the illustrative embodiment, by a single seat 45. The seat 45 is an arc of a circle.

The dog-leg lever 50 has at one end a yoke 51, with arms 52 and 53 spaced from one another, and carrying between them a pin 54, upon which a roller-follower 60 is mounted on roller bearings 55. The arms 53 and 52 are integral with a knuckle 56 mounted on a shaft 57 journaled in needle bearings 58 in the journal wells 35 and 36. A leg 59, integral at its one end with the knuckle 56 extends at an angle from the plane of the side faces of the cam plate 20 to a point axially displaced from the cam plate, and in line with the axis of the spring well 37. The free end of the leg 59 is within the lever cavity 34, a short distance from the open inner end of the spring well 37.

A helical compression spring 70 is mounted in the spring well 37 with one end abutting the inside face of the nut 38 and its other end abutting an annular flange on a plunger 75. The plunger 75 has a stem 76 which is slidably embraced within the helical compression spring 70 and a head 77 the outer surface of which bears against the lower end of the leg 59 of the lever 50. The compressive force of the spring 70 against the leg 59 can be varied by screwing the nut 38 in or out.

Figure 2:
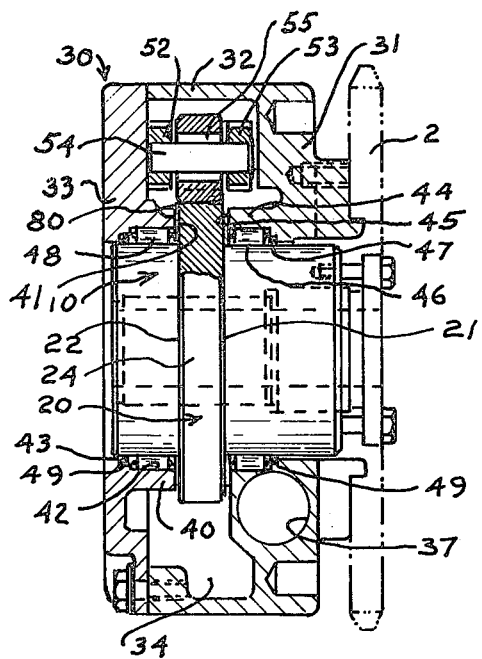
FIG. 2 is a sectional view taken along the line 2—2 of FIG. 1.
Figure 3:
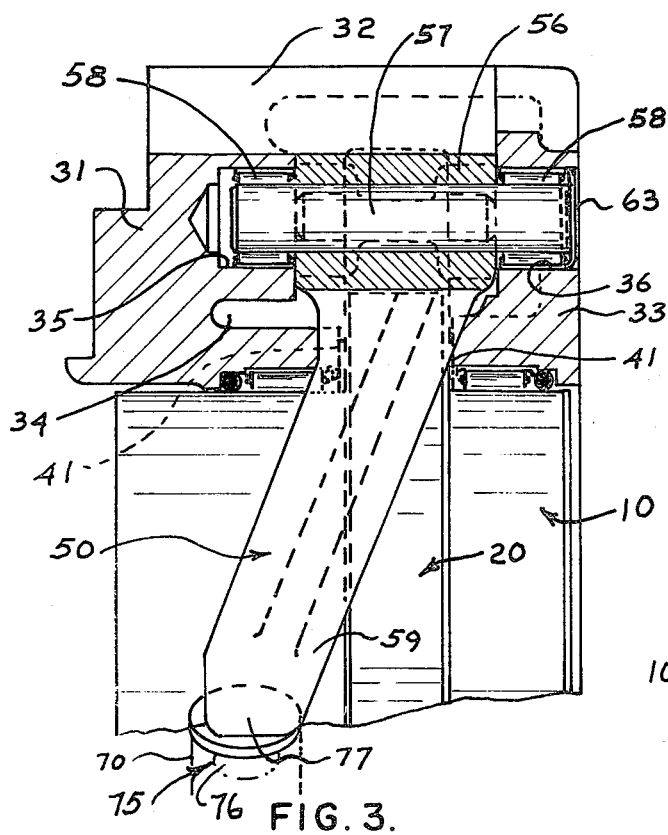
FIG. 3 is a sectional view taken along the line 3—3 of FIG. 1.

As will be seen from FIGS. 2 and 3, the roller-follower 60 is centered axially on the cam plate 20, and as seen from FIG. 1, is of substantially the same radius as the seat 45 so as not to bottom in the seat. The yoke arms 52 and 53 are symmetrically arranged with respect to and axially outboard of the cam plate 20 on either side thereof.

The lever cavity 34 is filled with lubricant, and the tightness of the housing walls and the arrangement of the sealing 0-rings 49 provides for substantially permanent lubrication of the elements within the housing.

The arrangement of the leg 59 and compression spring 70 permits the use of a relatively large diameter cam plate 20 with a compact housing. The provision of a totally enclosed, sealed housing permits, as has been indicated, permanent lubrication. Most importantly, the yoke mounting of both the roller-follower 60 and the dog-leg lever 50, with the anti-friction bearings journalling both the roller-follower and the lever shaft, permits the follower and cam plate to rotate with respect to one another when a jam occurs, freely and for all practical purposes, indefinitely, without damage to the cam plate, the follower, or any other component of the clutch. The clutch can be reset, after the jam is cleared, simply by rotating one of the housing and hub members with respect to the other in either direction, until the roller-follower seats in the seat 45.

Figure 4:
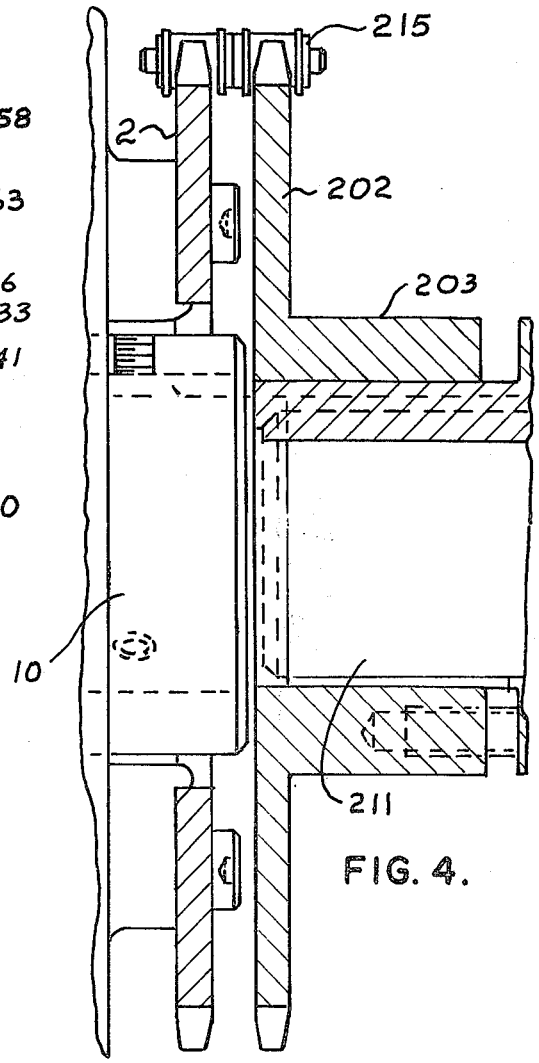
FIG. 4 is a fragmentary sectional view illustrating one coupling arrangement between a drive shaft and a driven shaft through an overload clutch of this invention.

While the sprocket 2 is merely illustrative of a means for transferring power to or from the clutch, this particular arrangement of mounting the sprocket to the housing permits the use of a simple chain coupling arrangement with substantial advantages. As shown in FIG. 4, a sprocket 202 with a hub 203 keyed to a shaft 211 is connected to the sprocket 2 by means of one half of a chain coupling 215, of a well known, readily available type, which provides reliable and inexpensive coupling with ample accommodation of misalignment, utilizing the existing sprocket mounting surface.

Figure 5:
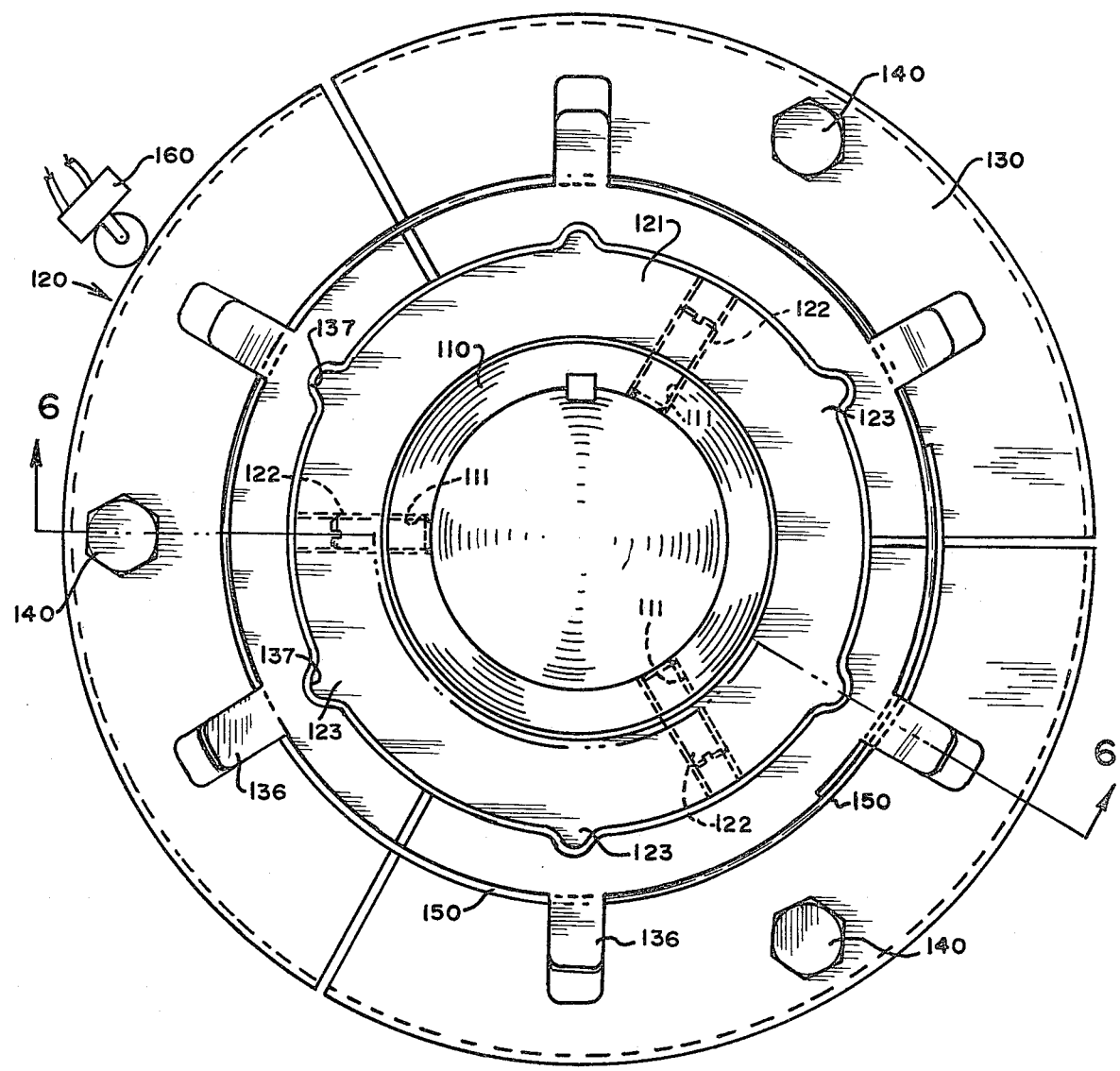
FIG. 5 is a view in end elevation of an overload clutch of this invention, slightly modified and provided with one embodiment of overload detector assembly of this invention.
Figure 6:
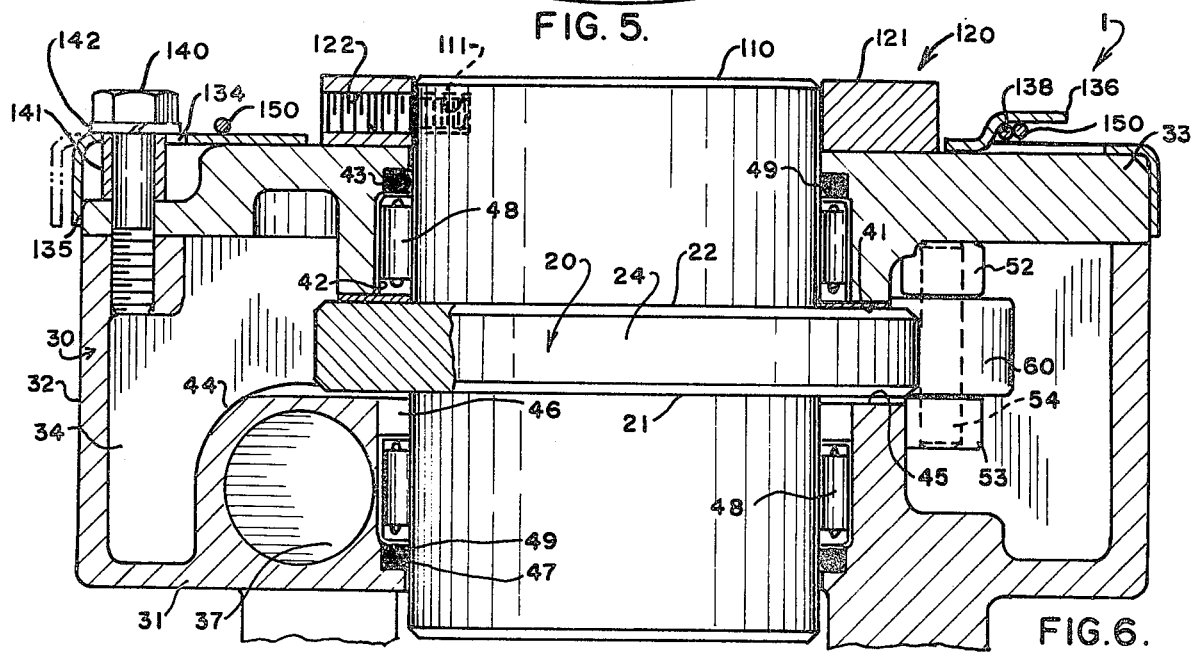
FIG. 6 is a sectional view taken along the line 6—6 of FIG. 5.

Referring now to FIGS. 5 and 6 for one illustrative embodiment of detector assembly 120 of this invention, mounted on the side wall 33 of the clutch housing and a hub 110 which is identical with the hub 10 shown in FIGS. 1–4 except for a longer axial extent, beyond the outside face of the side wall 33, and, in this embodiment, three set-screw receiving sockets 111.

The detector assembly 120 includes an annular cam hub 121, with set-screw passages 122 corresponding to set-screw receiving sockets 111, and circumferentially regularly spaced radially outwardly extending projections 123. The cam hub 121 is mounted tightly on the hub 110 and close to the outer face of the side wall 33 as shown in FIG. 6.

A segmented annulus 130 is made up of three segments 131, 132 and 133 spaced slightly from one another and slidably bolted to the outer face of the side wall 33 by means of bolts 140. Bolts 140 are three of the bolts by which the side wall 33 is bolted to the wall 32 of the housing, and are spaced 120° apart. The bolts 140 are longer than the rest of the side wall bolts, and are tightened against spacer sleeves 141, which extend through slots 134 in the segments 131, 132 and 133. The slots 134 are wider and radially longer than the sleeves 141 but narrower than a spring washer 142 between the head of the bolt and the sleeve.

Each of the segments, which are identical, has an outer flange 135 turned toward the clutch housing and normally bearing against an axially extending surface of the perimeter thereof. Each also has two, integral, struck out tabs 136, raised from the surface of the segment and open at their radially outer ends, and two indentations 137 in its radially inner edge positioned complementarily to the projections 125 on the cam hub. The abutment of the flange 135 provides some clearance, somewhat exagerated in FIG. 5, between the outer perimeter of the cam hub 110 and the projections 111 and the inner perimeter of the segments and their indentations.

The segments are biased radially inwardly by a circular spring 150, seated against a shoulder 138 of each tab 136. The spring 150 is strong enough to prevent movement of the segments in response to centrifugal force at any intended speed of rotation of the clutch.

As can be seen, the segments 131, 132 and 133 making up the annulus 130 are very thin. They transmit no turning torque and can be made of light metal or plastic, as can the cam hub 110.

When the clutch housing 30 and hub 110 start to rotate with respect to one another, the projections 123 of the hub will move out of the indentations and cam all of the segments radially outward at once, the movement being indicated in broken lines in FIG. 6. Thus, at any and every position, the detector assembly will react immediately to actuate a movement responsive control such as a micro-switch 160 indicated somewhat diagrammatically in FIG. 5. The "control" can perform either a signalling or operating function.

The lightness of the detector assembly means that it adds only negligible mass to the clutch and allows for a compact design, important considerations for repeated stop-start applications where inertia is important.

Numerous variations in the construction of the overload clutch and detector assembly of this invention will occur to those skilled in the art in the light of the foregoing disclosure. Merely by way of illustration and not of limitation, more than one follower seat can be provided, spaced angularly from the first seat. The seat 45 itself can be made assymetrical so as to make the release torque different for the two directions of rotation, and deeper or shallower or of different configurations to change the release torque characteristics. By in effect utilizing two housing members of the construction shown on the right side of FIG. 2, rotated through 180° in both directions, modifying the housing members to provide for another appropriate lever shaft journal well, and providing a second seat in the cam plate a two roller, plural seat device can be produced. However, the single follower — single seat arrangement of the preferred embodiment has advantages of simplicity and automatic angular orientation of the hub and housing not available to the more complex arrangements with a plurality of seats or followers. Different housing seals can be employed, the 0-rings 49 being simple and effective, but not the only types which can be used. Some or all of the indentations of the segments of the detector annulus and the projections of the cam hub can be reversed, or made different sizes and shapes, to produce greater or less travel of the segments. The numbers of segments making up the annulus can be varied from two to any greater number, although three or four are preferred. The rim of the annulus can be turned outwardly, although the inward turning has advantages of serving the dual function of stop and control element bearing track and of being more compact. The biasing of the segments can be accomplished by the use of other types of springs. If a manual reset is desired, the spring bias can be eliminated and a spring washer or the like used to hold the segment in place until the segment is cammed out and subsequently manually forced back when the blockage is cleared. If the clutch hub does not project beyond the face of the side wall, the cam hub can be mounted on the shaft, but the preferred embodiment is unitary and compact. These variations are merely illustrative.

Having thus described the invention, what is claimed and desired to be secured by Letters Patent is:

1. In an overload clutch in which a driven member is releasably connected to a driving member by means of a spring loaded follower, mounted on one of said members, normally engaged in a seat in a cam plate mounted on the other of said members, the improvement comprising a generally circular cam plate, narrow in its axial dimension relative to its radial dimension, fixedly mounted to a hub, said cam plate having in its periphery said seat; a housing rotatably mounted on said hub, said housing completely enclosing said cam plate, said housing having within it a lever cavity, spaced, aligned journal wells opening through side walls defining said lever cavity on opposite sides of said cam plate, and a spring well opening into said lever cavity at a point axially displaced from said cam plate; anti-friction bearings between said housing and said hub and providing bearing surfaces for relative rotation between said housing and said hub; annular seal means between said housing and said hub outboard of said anti-friction bearings in both axial directions, a dog-leg lever mounted in said lever cavity on a shaft journaled in anti-friction bearings mounted in said journal wells, said lever having a yoke at one end with arms positioned at either side of the axial extent of said cam plate and a pin extending between said arms, and a leg on the other side of said shaft from said yoke extending, at an angle, to a position axially clear of the cam plate at the end of said leg opposite said yoke; a roller-follower rotatably mounted, on anti-friction bearings, on said lever yoke pin, said roller-follower seating in said cam plate seat; and a compression spring seated at one end in said housing spring well and bearing at its other end upon said lever leg at the end of said lever leg axially clear of said cam plate.

2. The improvement of claim 1 including a sprocket mounted outside of and to a side wall of the clutch housing concentrically with the hub of said clutch.

3. The improvement of claim 1 wherein the clutch hub projects axially beyond the outer face of a housing side wall and including a cam hub mounted on the clutch hub, outside of said side wall, an annulus mounted on said outer face of said side wall and a movement responsive control device, said annulus comprising a plurality of segments, all radially slidably mounted on said outer face of the side wall of the clutch housing and each having a radially inward surface adjacent and facing a radially outer surface of said cam hub and a radially outer surface constituting a bearing track, said inner surface of said segments and said outer surface of said cam hub having complementary projections and indentations normally nesting in one another, means for yieldably maintaining the segments in a radially inward position at which the said projections and indentations nest, said projections and the surface defining the indentations serving to cam the segments to move them radially outwardly when the cam hub is rotated with respect to said segments, and said control device having means, positioned contiguous the segments bearing tracks to be operated by said outward radial movement of said segments.

4. In an overload clutch connected to a shaft, said clutch being enclosed by a housing having a radially extending side wall the improvement comprising a cam hub mounted to rotate with said shaft, an annulus mounted on the outer face of said side wall and a movement responsive control device, said annulus comprising a plurality of segments, all radially slidably mounted on said outer face of the side wall of the clutch housing and each having a radially inward surface adjacent and facing a radially outer surface of said cam hub and a radially outer surface constituting a bearing track, said inner surface of said segments and said outer surface of said cam hub having complementary projections and indentations normally nesting in one another, means for yieldably maintaining the segments in a radially inward position at which the said projections and indentations nest, said projections and the surface defining the indentations serving to cam the segments to move them radially outwardly when the cam hub is rotated with respect to said segments, and said control device having means, positioned contiguous the segments bearing tracks to be operated by said outward radial movement of said segments.

5. The improvement of claim 4 wherein the annulus is made of thin sheet material, and the radially outer surface is constituted by a flange turned from the plane of said sheet.

6. The improvement of claim 5 wherein each of the segments making up the annulus has at least one tab struck out at its radially outer end, and the means for yieldably maintaining the segments in a radially inward position comprise a circular spring seated on a shoulder of said tabs.

7. The improvement of claim 5 wherein the said flange is turned toward and embraces a surface of the periphery of said housing.

8. The improvement of claim 5 wherein the projections and indentations do not touch when normally nested.

* * * * *